United States Patent
Kim et al.

(10) Patent No.: US 8,259,646 B2
(45) Date of Patent: Sep. 4, 2012

(54) APPARATUS AND METHOD FOR ACQUIRING FRAME SYNCHRONIZATION AND FREQUENCY SYNCHRONIZATION SIMULTANEOUSLY IN COMMUNICATION SYSTEM

(75) Inventors: Pan-Soo Kim, Daejeon (KR); Dae-Ig Jang, Daejeon (KR); Deock-Gil Oh, Daejeon (KR); Ho-Jin Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 639 days.

(21) Appl. No.: 12/517,432

(22) PCT Filed: Dec. 3, 2007

(86) PCT No.: PCT/KR2007/006173
§ 371 (c)(1),
(2), (4) Date: Jun. 3, 2009

(87) PCT Pub. No.: WO2008/069512
PCT Pub. Date: Jun. 12, 2008

(65) Prior Publication Data
US 2010/0039985 A1    Feb. 18, 2010

(30) Foreign Application Priority Data

Dec. 4, 2006 (KR) .................... 10-2006-0121821
Oct. 5, 2007 (KR) .................... 10-2007-0100600

(51) Int. Cl.
*H04J 3/06* (2006.01)
(52) U.S. Cl. ...................... 370/326; 370/350
(58) Field of Classification Search .............. 370/321, 370/324, 326, 345, 350, 503, 252, 203
See application file for complete search history.

(56) References Cited

U.S. PATENT DOCUMENTS 4,262,356 A    4/1981 Lautier et al.
(Continued)

FOREIGN PATENT DOCUMENTS

KR    10-2005-0120659 A    12/2005
(Continued)

OTHER PUBLICATIONS

Translation of a final rejection mailed by the Korean Intellectual Property Office on Nov. 30, 2009 in Korean Patent Application No. 10-2007-0100600.
(Continued)

*Primary Examiner* — Brian D Nguyen
(74) *Attorney, Agent, or Firm* — Kile Park Goekjian Reed & McManus PLLC

(57) ABSTRACT

An apparatus and method for acquiring reliable frame synchronization performance and frequency synchronization simultaneously in a communication system includes a differential correlator outputting a result value obtained by performing a differential operation based on an input signal having symbol timing synchronization and a value pre-defined with a sender sending the input signal, a frequency error calculator compensating for a frequency error based on the result value of the differential correlator and a frequency compensation control signal, and a frame synchronization determiner outputting the frequency compensation control signal if the result value of the differential correlator is greater than a threshold set having at least one value. By introducing a correlation scheme, i.e. Differential Generalized Post Detection Integration (DGPDI), in which differential information corresponding to a half of a symbol duration length is used within a duration from a frame start symbol to a UW symbol duration in a TDM/TDMA transmission structure in which a low SNR and a high frequency error must be considered, a more reliable frame synchronization estimation value can be acquired in comparison to a conventional frame synchronization scheme in which differential information between single neighbor symbols is used.

12 Claims, 7 Drawing Sheets

U.S. PATENT DOCUMENTS

| | | | |
|---|---|---|---|
| 2004/0090352 A1* | 5/2004 | Jaffe et al. | 341/50 |
| 2006/0078040 A1 | 4/2006 | Sung et al. | |
| 2006/0209993 A1* | 9/2006 | Lu | 375/336 |
| 2006/0250285 A1* | 11/2006 | Jaffe et al. | 341/60 |
| 2006/0274820 A1* | 12/2006 | Walton et al. | 375/148 |
| 2007/0133727 A1* | 6/2007 | Kim et al. | 375/367 |
| 2007/0183391 A1* | 8/2007 | Akita et al. | 370/350 |

FOREIGN PATENT DOCUMENTS

| | | |
|---|---|---|
| KR | 10-2006-0032379 A | 4/2006 |
| KR | 10-2006-0066581 A | 6/2006 |
| KR | 10-2006-0107574 A | 10/2006 |
| KR | 100763598 B1 | 9/2007 |
| WO | 2004/088901 A2 | 10/2004 |
| WO | 2006/062308 A1 | 6/2006 |

OTHER PUBLICATIONS

Translation of a non-final rejection mailed by the Korean Intellectual Property Office on Apr. 24, 2009 in Korean Patent Application No. 10-2007-0100600.

International Search Report of International Application No. PCT/KR2007/006173 filed on Dec. 3, 2007.

Written Opinion of the International Application No. PCT/KR2007/006173 filed on Dec. 3, 2007.

Marco Villanti, Raffaella Pedone, Matteo Iubatti, and Giovanni E. Corazza, On the Design of a Common Avenue for Frequency Estimation and Frame Synchronization, IEEE, 2006, pp. 1455-1460.

Giovanni Emanuele Corazza and Raffaella Pedone, Generalized and Average Post Detection Integration Methods for Code Acquisitoin, IEEE, 2004, pp. 207-211.

* cited by examiner

FIG. 8

| | | | | Single dwell TC mean acquisition time performance | | | | |
|---|---|---|---|---|---|---|---|---|
| Penalty Time | Detector scheme | Normalized Threshold | Absolute Threshold | Simulated Pfa | Simulated Pmd | Simulated Pd | Mean Acquistion Time [s] | Mean Acquisition Time [frames] |
| $2T_F$ | DPDI | 3.88 | 52.7 | 1.5E-05 | 0.988 | 0.012 | 0.219 | 164 |
| $2T_F$ | GPDI | 2.44 | 1222.0 | 7.6E-06 | 0.950 | 0.050 | 0.039 | 29 |
| $2T_F$ | D-GPDI | 2.36 | 1098.6 | 7.4E-06 | 0.937 | 0.063 | 0.031 | 23 |
| $2T_F$ | CLD L0 | 0.22 | 10700.5 | 1.0E-05 | 0.902 | 0.098 | 0.021 | 16 |
| $T_F$ | DPDI | 3.67 | 49.9 | 4.3E-05 | 0.980 | 0.020 | 0.158 | 118 |
| $T_F$ | GPDI | 2.28 | 1141.9 | 2.8E-05 | 0.917 | 0.083 | 0.030 | 22 |
| $T_F$ | D-GPDI | 2.20 | 1024.1 | 2.8E-05 | 0.899 | 0.101 | 0.024 | 18 |
| $T_F$ | CLD L0 | 0.20 | 9554.0 | 2.4E-05 | 0.868 | 0.132 | 0.017 | 13 |

APPARATUS AND METHOD FOR ACQUIRING FRAME SYNCHRONIZATION AND FREQUENCY SYNCHRONIZATION SIMULTANEOUSLY IN COMMUNICATION SYSTEM

This work was supported by the IT R&D program of MIC/ITTA[2005-S-013-02, Development of Broadband Adaptive Satellite Communication and Broadcasting Convergence Technology1.

CROSS-REFERENCE TO RELATED PATENT APPLICATION

This application claims the benefit of Korean Patent Application Nos. 10-2006-0121821, filed on Dec. 4, 2006 and 10-2007-0100600, filed on Oct. 5, 2007, in the Korean Intellectual Property Office, the disclosure of which is incorporated herein in its entirety by reference.

BACKGROUND OF THE INVENTION

1. Field of the Invention

The present invention relates to an apparatus and method for acquiring initial synchronization at a high data rate in a satellite communication/broadcasting system in which a low Signal to Noise Ratio (SNR) and a high frequency difference exist.

2. Description of the Related Art

In order to accomplish proper communication in communication systems, especially in Time Division Multiplexing (TDM)/Time Division Multiple Access (TDMA) digital transmission systems, estimation and compensation of a carrier frequency error occurring due to frame synchronization technology of determining a beginning point of a frame in a receiver end and imperfection of a local oscillator of a transmission and reception end are definitely required. In general, the performance of a frame and frequency synchronization process performed right after symbol timing synchronization in an initial synchronization mode is an important parameter acting as the basic assumption for the performance required for the entire system.

Recently, DVB-S2 (Digital Video Broadcasting-Satellite, Second Generation) and DVB-RCS (Digital Video Broadcasting-Return Channel System), which are representative digital transmission standards using a TDM/TDMA scheme, satisfy a low bit error rate even in a poor channel environment, such as a low SNR, by introducing a robust channel code, such as a Low-Density Parity-Check (LDPC) code or a turbo code, enabling communication with a high data rate and high quality. For example, in a case of DVB-S2 system, which is a next generation satellite communication/broadcasting system, when Quadrature Phase Shift Keying (QPSK) modulation method is used, a bit frame is 64,800, and a code rate is ¼, a Packet Error Rate (PER) is about $10^{-7}$ at $E_S/N_o = -2.35$ dB, i.e., a high quality communication system can be achieved. In addition, Since a carrier frequency usually corresponds to Ku/Ka band when satellite communication and a high frequency are used, a frequency error based on a bandwidth is relatively very high in comparison to other systems. Furthermore, a Doppler frequency error occurring in a high-speed mobile environment, such as high-speed train or airplane, is also largely generated. Actually, in the case of DVB-S2 system, a considered frequency error is ±5 MHz, and thus, when a bandwidth is considered as 25 MHz, a frequency error of ±20% based on the bandwidth is generated.

Moreover, in a case of DVB-RCS system, a symbol rate may be hundreds Ksps in general due to a variety of return link traffic. In this case, if a Doppler frequency error of 1,000 Km/h is generated in an airplane, the maximum frequency error of ±10% based on a bandwidth is generated. In particular, in a case of CSC/ACQ/SYNC burst for initial connection and synchronization, it is expected that a frequency error of more than several percentages is always generated. Due to these channel performance degradation causes, it is difficult to establish initial synchronization at a high data rate, and thus, the present invention suggests a method of simultaneously performing frame synchronization and frequency synchronization in order to overcome this difficulty.

In recent wireless communication systems including the DVB-S2/DVB-RCS systems, the development of robust channel code technology, such as LDPC, allows the systems to enable a broadband (high data rate) and high quality service. However, a conventional initial synchronization scheme causes problems that initial synchronization is significantly delayed due to a low SNR and a high frequency error in a channel and a demodulation circuit of a receiver end for the initial synchronization is complicated.

SUMMARY OF THE INVENTION

The present invention provides an apparatus and method for simultaneously acquiring reliable frame synchronization performance and frequency synchronization performance while overcoming a low SNR and a high frequency error at a high data rate.

According to an aspect of the present invention, there is provided an apparatus for acquiring frame synchronization and frequency synchronization simultaneously in a communication system, the apparatus for acquiring synchronization in a Time Division Multiplexing (TDM)/Time Division Multiple Access (TDMA) demodulation system having a frame comprising a header having a constant length, the apparatus comprising: a differential correlator outputting a result value obtained by performing a differential operation based on an input signal having symbol timing synchronization and a value pre-defined with a sender transmitting the input signal; a frequency error calculator compensating for a frequency error based on the result value of the differential correlator and a frequency compensation control signal; and a frame synchronization determiner outputting the frequency compensation control signal if the result value of the differential correlator is greater than a threshold set having at least one value.

According to another aspect of the present invention, there is provided a method of acquiring frame synchronization and frequency synchronization simultaneously in a communication system, the method of acquiring synchronization in a Time Division Multiplexing (TDM)/Time Division Multiple Access (TDMA) demodulation system having a frame comprising a Unique Word (UW) having a constant length, the method comprising: performing a differential operation based on an input signal having symbol timing synchronization and a value pre-defined with a sender sending the input signal; comparing the differential operation result value and a threshold set having at least one value, and if the differential operation result value is greater than the threshold set, generating a frequency compensation control signal; and compensating for a frequency error of the input signal based on the differential operation result value and the frequency compensation control signal.

BRIEF DESCRIPTION OF THE DRAWINGS

The above and other features and advantages of the present invention will become more apparent by describing in detail exemplary embodiments thereof with reference to the attached drawings in which:

FIG. 8 is a table illustrating a frame synchronization acquisition time when the present invention is applied.

DETAILED DESCRIPTION OF THE INVENTION

The present invention will be described in detail by explaining embodiments of the invention with reference to the attached drawings.

Figure 1:
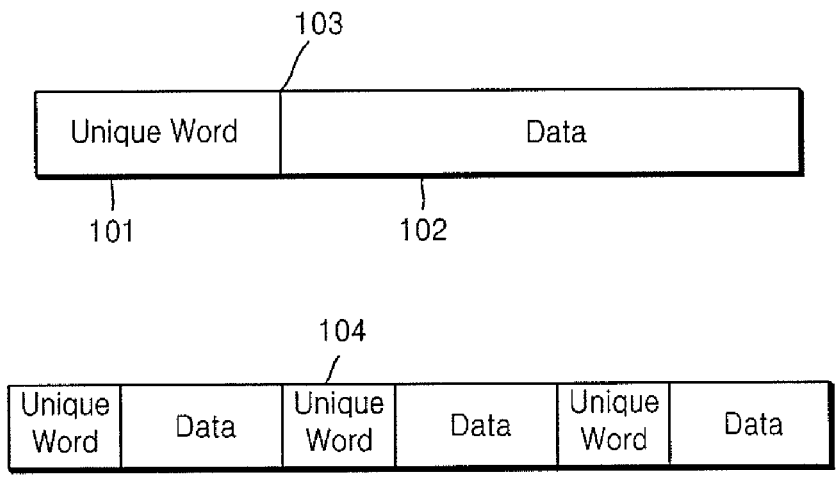
FIG. 1 is a structure of a transport frame applicable to the present invention.
Figure 2:
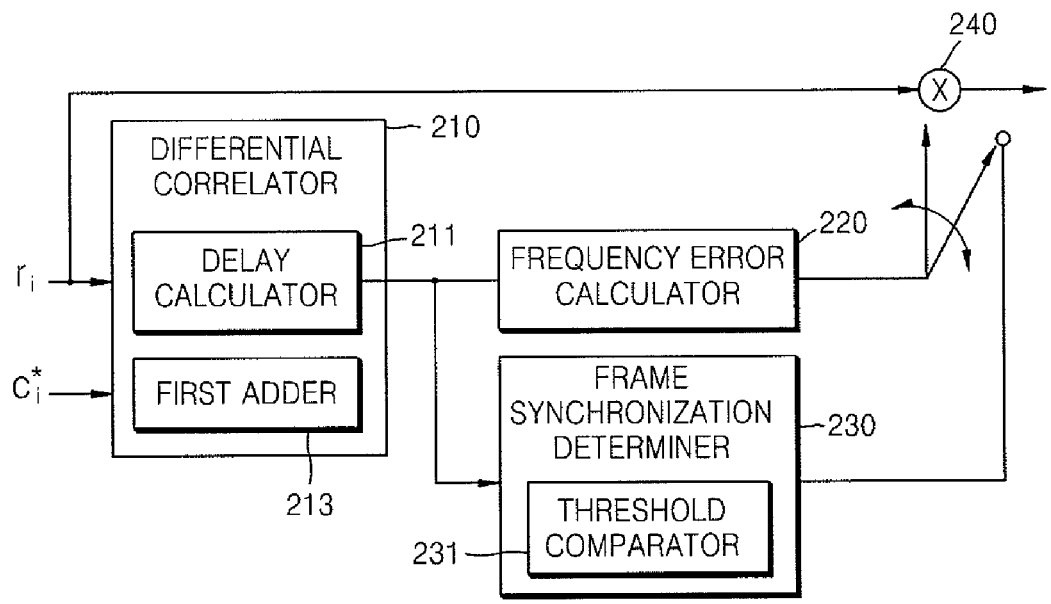
FIG. 2 is a block diagram of an apparatus for acquiring frame synchronization and frequency synchronization simultaneously in a Time Division Multiplexing (TDM)/Time Division Multiple Access (TDMA) transmission scheme according to an embodiment of the present invention.
Figure 3:
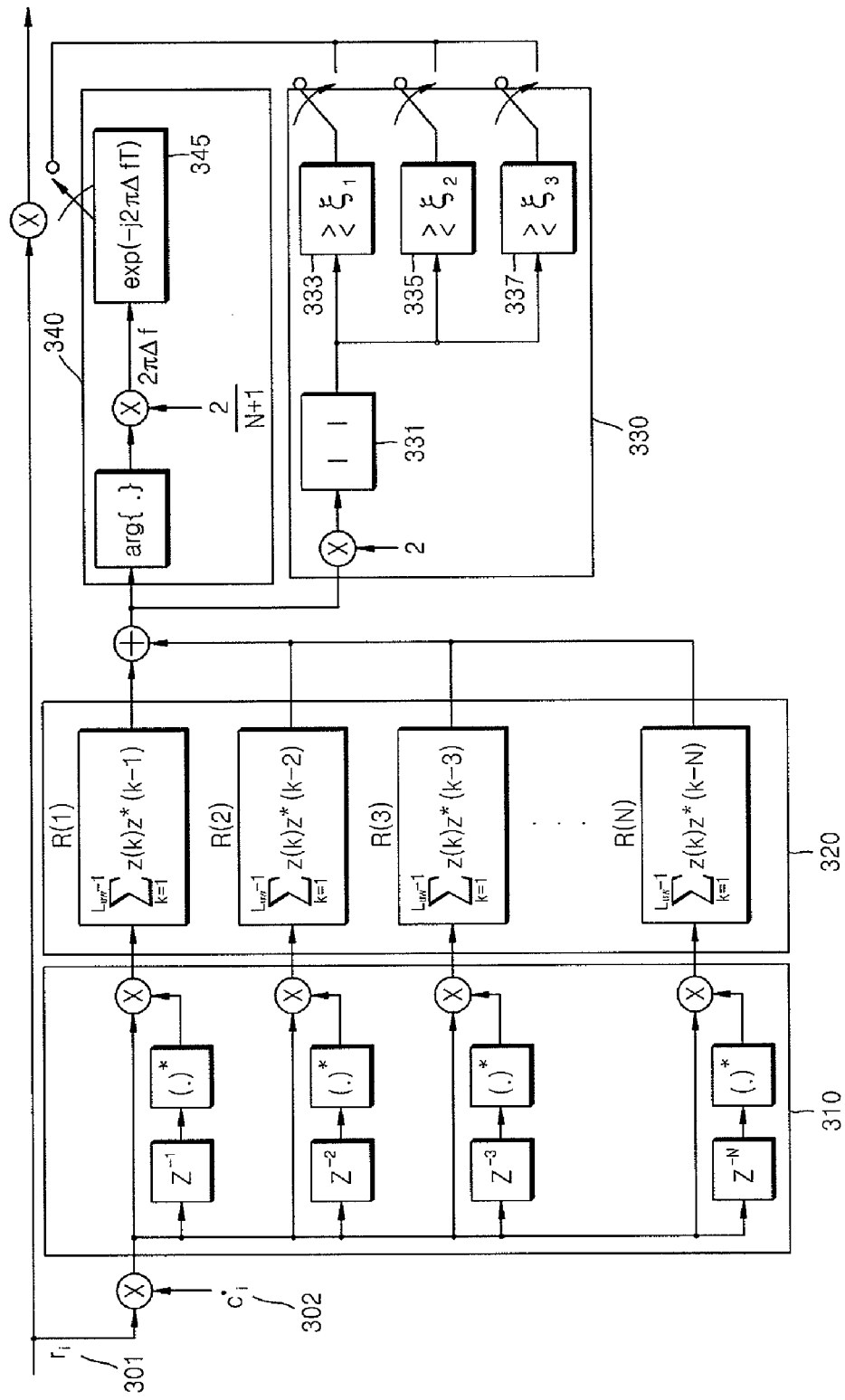
FIG. 3 is a detailed block diagram of the apparatus illustrated in FIG. 2.
Figure 4:
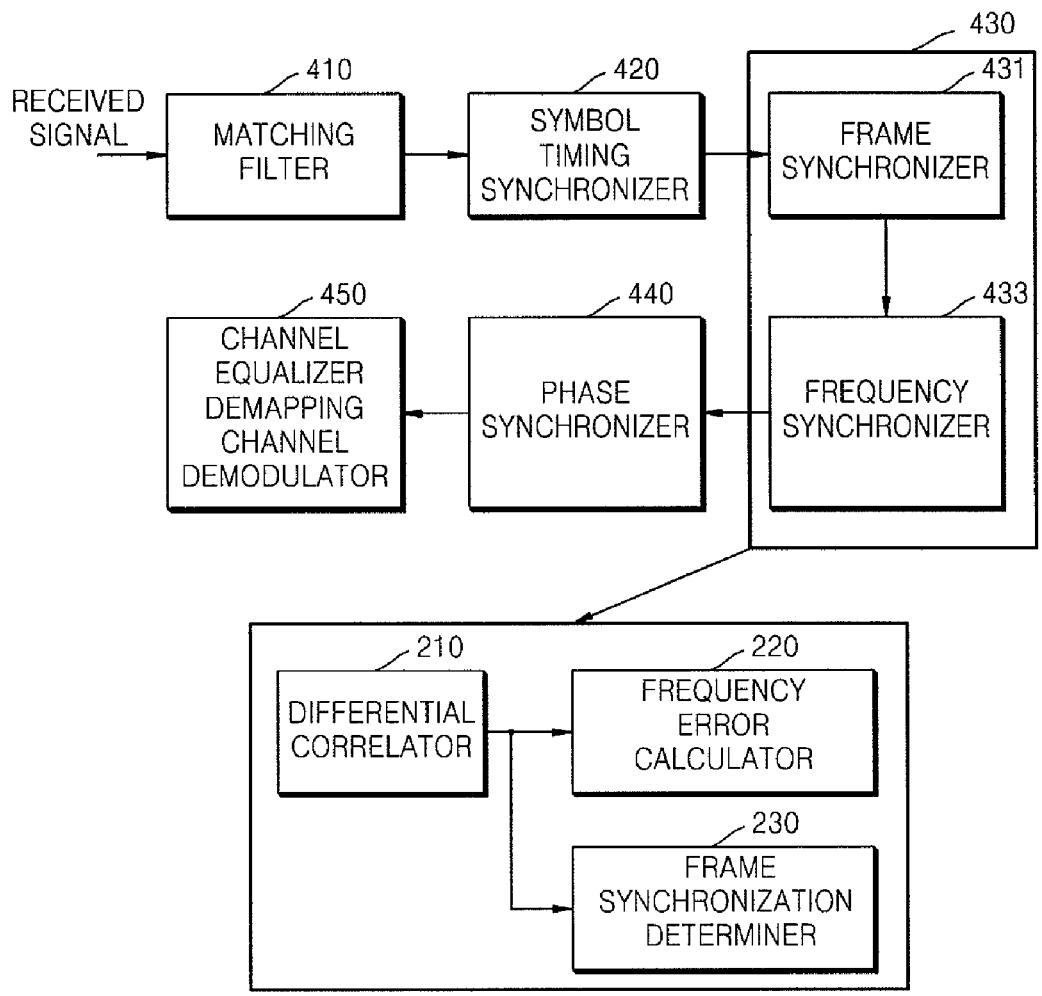
FIG. 4 is a block diagram of a TDM/TDMA receiver to which the apparatus illustrated in FIGS. 2 and 3 are applied, according to an embodiment of the present invention.
Figure 5:
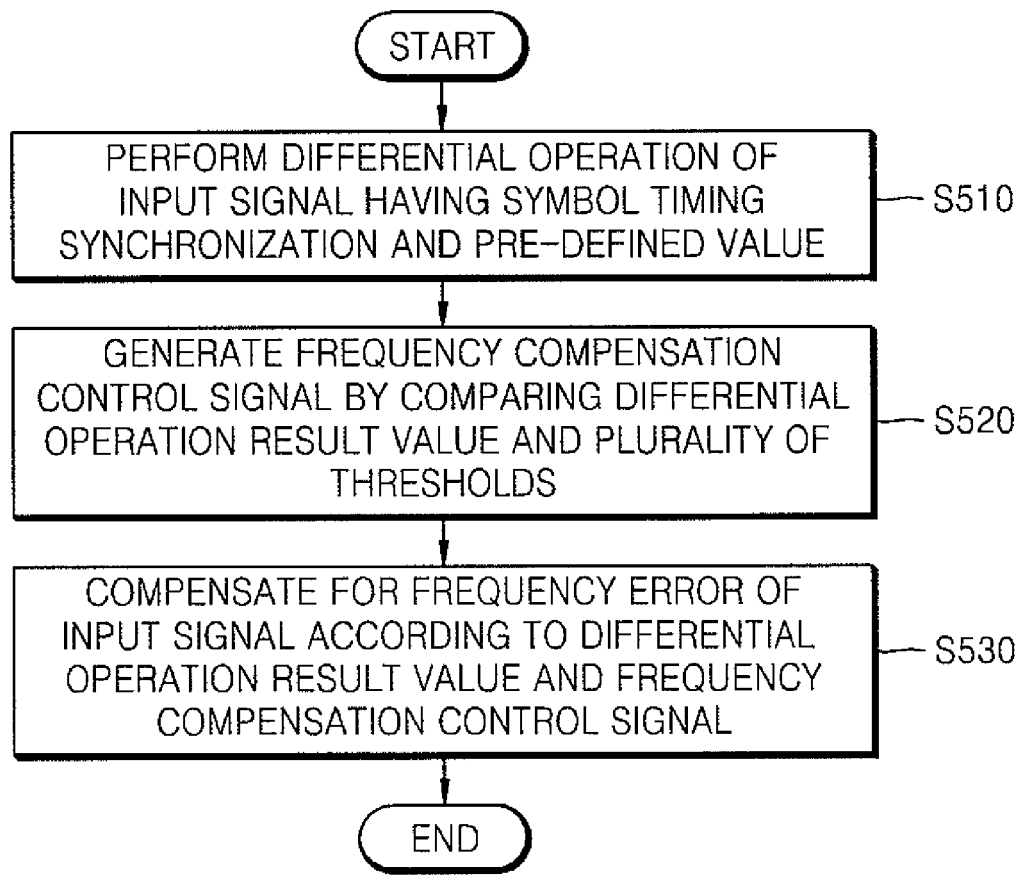
FIG. 5 is a flowchart illustrating a method of acquiring frame synchronization and frequency synchronization simultaneously in a TDM/TDMA transmission scheme according to an embodiment of the present invention.
Figure 6:
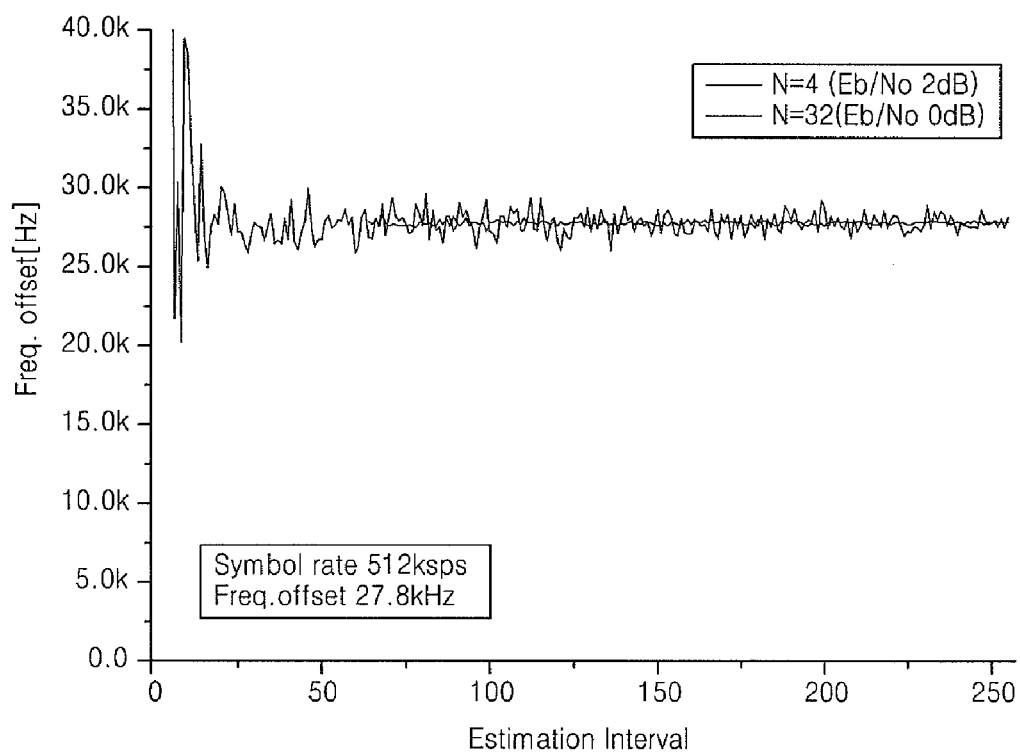
FIG. 6 is a graph for describing a process of detecting a frequency error according to a Unique Word (UW) length when the present invention is applied.
Figure 7:
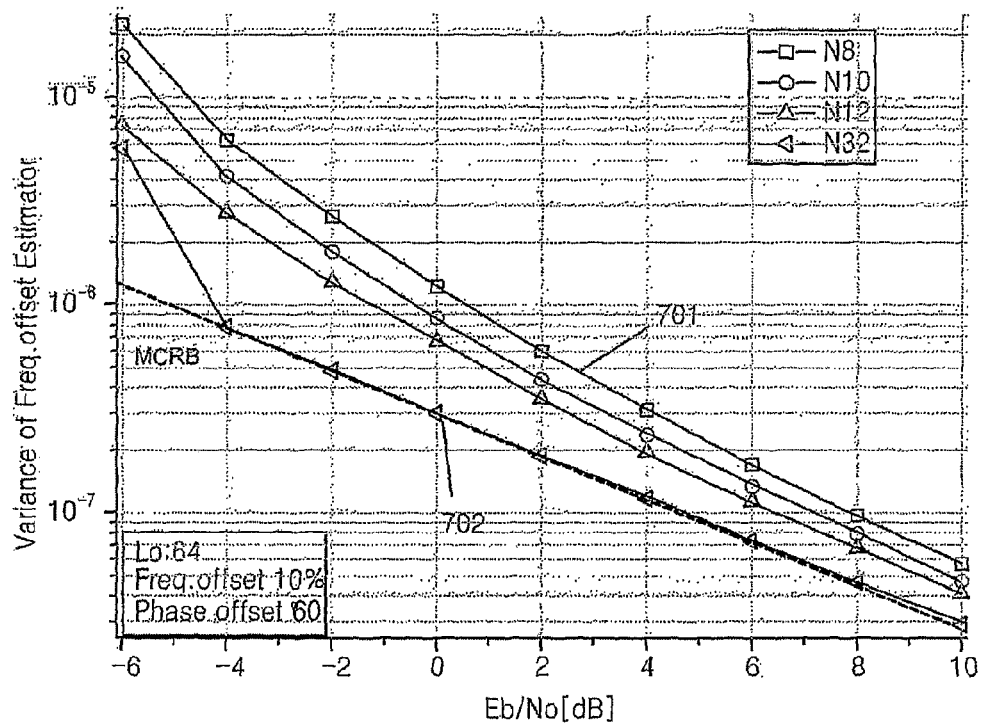
FIG. 7 is a graph for describing frequency estimation error performance according to $E_S/N_o$ when the present invention is applied.

FIG. 1 is a structure of a transport frame applicable to the present invention. FIG. 2 is a block diagram of an apparatus for acquiring frame synchronization and frequency synchronization simultaneously in a Time Division Multiplexing (TDM)/Time Division Multiple Access (TDMA) transmission scheme according to an embodiment of the present invention, FIG. 3 is a detailed block diagram of the apparatus illustrated in FIG. 2, and FIG. 4 is a block diagram of a TDM/TDMA receiver to which the apparatus illustrated in FIGS. 2 and 3 are applied, according to an embodiment of the present invention. FIG. 5 is a flowchart illustrating a method of acquiring frame synchronization and frequency synchronization simultaneously in a TDM/TDMA transmission scheme according to an embodiment of the present invention. FIG. 6 is a graph for describing a process of detecting a frequency error according to a Unique Word (UW) length when the present invention is applied, and FIG. 7 is a graph for describing frequency estimation error performance according to $E_S/N_o$ when the present invention is applied. FIG. 8 is a table illustrating a frame synchronization acquisition time when the present invention is applied.

For convenience of description and easiness of understanding, the apparatus and the method will be described together, and functions or constructions, which can be easily understood by one of ordinary skill in the art, are not described in detail since they would obscure the invention in unnecessary detail. The present invention is applied to communication systems, and a TDM/TDMA transmission scheme will be described as an example. In addition, a header in the claims is described as a Unique Word (UW) hereinafter.

The present invention performs frame synchronization and frequency error estimation in the TDM/TDMA transport frame (burst) structure and in the construction of FIGS. 2 and 3. In order to overcome a frequency error in initial synchronization, a method of performing correlation using differential information corresponding to a half of the maximum symbol length in a UW symbol duration corresponding to the length $L_{UW}$ from a start symbol, detecting a frame start time by means of comparison between a correlation value and a threshold by applying a Threshold Crossing (TC) scheme to the correlation, and compensating for a frequency error with a calculated frequency error compensation value is used.

FIG. 1 is a frame structure in a conventional TDM/TDMA transmission structure. In order to detect a start time of initial data at a receiver end in a TDM/TDMA transmission system, frame synchronization must be performed. In this case, the receiver end performs data correlation in a state in which the receiver end knows specific data transmitted from a transmitter end. In FIG. 1, reference numeral 101 denotes a UW corresponding to the specific data, reference numeral 102 denotes traffic data, reference numeral 103 denotes a burst formed with the UW 101 and the traffic data 102, and reference numeral 104 denotes a distributed pilot transport frame structure having a pattern in which a UW and data are alternately repeated. A representative system having the transmission structure referred to as 103 is a DVB-RCS (Digital Video Broadcasting-Return Channel System), and a representative system having the transmission structure referred to as 104 corresponds to DVB-S2 (Digital Video Broadcasting-Satellite, Second Generation).

Referring to FIGS. 2 and 5, a differential correlator 210 performs a differential operation based on an input signal $r_i$ in which symbol timing synchronization is achieved and a value $c_i$ pre-defined with a sender transmitting the input signal $r_i$ in operation S510. The differential correlator 210 includes a delay calculator 211, which multiplies the input signal $r_i$ by a conjugate complex value of the value $c_i$ pre-defined with the sender transmitting the input signal $r_i$, performs a conjugate complex operation after delaying the multiplication result by a one-symbol unit, and multiplies the conjugate complex operation result by the multiplication result, and a first adder 213 summing an output of the delay calculator 211 by the length of a UW.

A frequency error calculator 220 compensates for a frequency error of the input signal $r_i$ by increasing or decreasing the frequency error according to a result value output from the differential correlator 210 and a frequency compensation control signal output from a frame synchronization determiner 230 in operation S530.

The frame synchronization determiner 230 sequentially compares the result value output from the differential correlator 210 and a set of thresholds set in a threshold comparator 231, i.e. different thresholds, and outputs the frequency compensation control signal according to the comparison result. In this case, if the result value output from the differential correlator 210 is equal to or less than a threshold, the result value exists within an allowed error range, and thus, compensation is unnecessary. However, if the result value output from the differential correlator 210 is greater than a threshold, compensation is necessary, and thus, the frequency compensation control signal is enabled, performing the compensation. This compensation is performed for each of the different thresholds in operation S520.

The apparatus illustrated in FIG. 2 will now be described in more detail with reference to FIG. 3. $r_i$ 301 is a received signal for which a symbol timing synchronization function has been performed and is represented using Equation 1.

$$r_k = \sum_{k=-\infty}^{\infty} \sqrt{E_s}\, a_k e^{j(2\pi\Delta fT + \phi)} \quad \text{(Equation 1)}$$

Here, $r_k$ denotes a received signal of a $k^{th}$-symbol time, $a_k$ denotes a data symbol stream, which is the same as $c_k$ in a UW length duration and corresponds to a modulation method in a data duration except the UW, $\Delta fT$ denotes the amplitude of a frequency error normalized to a symbol rate, and $\phi$ denotes a phase error.

$c_i^*$ 302 denotes a UW symbol stream known by a receiver end. $c_i^*$ 302 is a conjugate complex number of a UW symbol stream and is multiplied by $r_i$ 301.

A block 310 is a detailed configuration of a delay calculator 211 and performs one-symbol unit delay, a conjugate complex operation, and multiplication. The apparatus illustrated in FIG. 3 performs an addition operation corresponding to a relevant UW length with respect to a differential correlation operation corresponding to a half of a maximum UW symbol. Blocks 310 and 320 correspond to the differential correlator 210 illustrated in FIG. 2 as logics sharing for frame synchronization and frequency synchronization. For the frame synchronization, the frame synchronization determiner 230 of a block 330 is necessary. For frequency error estimation, a block 340 is additionally applied, and a block 345 compensates for an estimated frequency error.

$$\frac{2}{N+1}$$

multiplied in the block 340 is a value for implementing optimal performance, and it is preferable that an optimal value be selected by using a trial and error method. A compensation function of the block 345 is performed by multiplying a value output from the differential correlator 210 by an integer value (even though the integer value is 2 in FIG. 3, it is preferable that an optimal value be selected by using the trial and error method.), obtaining an absolute value of the multiplication result, and generating a control signal only if a correlation value, which is the absolute value, is greater than a threshold. The threshold comparator 231 can perform the comparison function with various thresholds. In the current embodiment, three thresholds 333, 335, and 337 are used as examples, wherein an operator may variably use each threshold according to requirements of channel information, an initial synchronization time, and a false alarm probability.

A TDM/TDMA demodulator will now be described with reference to FIG. 4. A received signal illustrated in FIG. 4 is a digital data sample stream obtained by assigning a channel in a transmitter end, down-converting the channel to an Intermediate Frequency (IF) in a receiver end, converting the IF to a base band, and passing the base band through an Analog-to-Digital Converter (ADC). A matching filter 410 is a filter having the same structure as a pulse type filter of the transmitter end. In the current embodiment, the matching filter 410 acts as a Low Pass Filter (LPF) so that the digital data sample stream has the maximum SNR. A symbol timing synchronizer 420 performs a symbol timing synchronization function for seeking an optimal point (a point having the maximum SNR) in a symbol duration by adjusting clock timing of symbol streams of an input signal. After performing the timing synchronization, the digital signal can be operated with one sample per symbol by a decimation function. Thereafter, by detecting a start point of a frame (burst), a distorted signal in the channel is compensated for using known data (UW) transmitted from the transmitter end. A frame synchronizer 431 detects a start point of a frame (burst), and a frequency synchronizer 433 performs a channel demodulation function by receiving frame start timing information from the frame synchronizer 431. If a block 430 is re-configured, the block 430 includes the differential correlator 210, the frequency error calculator 220, and the frame synchronization determiner 230 as described with reference to FIGS. 2 and 3.

FIG. 6 is a graph showing a frequency error estimation value output as a result obtained by controlling an operation of the frequency error calculator 220 using synchronization flag control, i.e. a control signal generated by the frame synchronization determiner 230 as a result of comparison with each threshold, when the present invention is used, showing that accuracy of estimation is determined according to a UW length.

FIG. 7 is a graph showing accuracy of a frequency error estimation value calculated by flag control using a control signal generated by performing threshold comparison when initial frame synchronization is performed, showing differences of accuracy according to a value N in a case of UW 64 symbol. As N increases, frequency error estimation accuracy increases. Reference numeral 701 denotes a curve of which N is 8. Reference numeral 702 denotes a Modified Cramer-Rao Bound (MCRB) curve showing an ideal limit value of frequency estimation performance in the UW 64 symbol.

FIG. 8 is a table illustrating a mean acquisition time expected when a frame synchronization scheme using multiple differential information used in the present invention is applied.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

As described above, according to the present invention, by introducing a correlation scheme, i.e. Differential Generalized Post Detection Integration (DGPDI), in which differential information corresponding to a half of a symbol duration length is used within a duration from a frame start symbol to a header (the same meaning as a Unique Word (UW)) symbol duration in a TDM/TDMA transmission structure in which a low SNR and a high frequency error must be considered, a more reliable frame synchronization estimation value can be acquired in comparison to a conventional frame synchronization scheme in which differential information between single neighbor symbols is used can be acquired. Moreover, by compensating a frequency error estimation value after frame synchronization is temporarily determined, quick initial synchronization.

The present invention relates to technology for performing initial synchronization, i.e. frame synchronization and frequency synchronization, using a UW in a TDM/TDMA transmission structure having a degraded channel environment. For example, by simultaneously performing frame synchronization and frequency synchronization using multiple differential information in order to perform high-speed initial synchronization in an environment of a low SNR and a high frequency error (as an example of a concrete system, in a case of DVB-S2, a considered minimum SNR: $E_S/N_o = -2.35$ dB, a maximum frequency error: 20% based on a bandwidth), long initial synchronization time can be reduced.

Since the present invention can simultaneously perform high-speed initial synchronization, frame synchronization, and frequency synchronization in communication systems having a TDM/TDMA transmission structure, which include DVB-S2/DVB-RCS transmission systems operating with a low SNR and a high frequency error, a demodulator function meeting recently required high-speed synchronization acquisition and high-quality service can be performed, and a demodulator circuit and operation can be reduced by sharing a circuit for common parts.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. An apparatus for acquiring frame synchronization and frequency synchronization simultaneously in a communication system having a frame comprising a header having a constant length, the apparatus comprising:
    a differential correlator outputting a result value obtained by performing a differential operation based on an input signal having symbol timing synchronization and a value pre-defined with a sender transmitting the input signal;
    a frequency error calculator compensating for a frequency error based on the result value of the differential correlator and a frequency compensation control signal; and
    a frame synchronization determiner outputting the frequency compensation control signal if the result value of the differential correlator is greater than a threshold set having at least one value.

2. The apparatus of claim 1, wherein the differential correlator comprises:
    a delay calculator multiplying the input signal by a conjugate complex value of the value pre-defined with the sender transmitting the input signal to obtain a multiplication result, performing a conjugate complex operation to obtain a conjugate complex operation result after delaying the multiplication result by a one-symbol unit, and multiplying the conjugate complex operation result by the multiplication result; and
    a first adder summing an output of the delay calculator by the length of the header.

3. The apparatus of claim 2, wherein the delay calculator calculates a differential correlation value corresponding to a half of the length of the header, and first adders corresponding to the half of the length of the header are parallel connected.

4. The apparatus of claim 1, wherein the frame synchronization determiner obtains a correlation value by multiplying a value output from the differential correlator by an integer value to obtain a multiplication result and obtaining an absolute value of the multiplication result, and compares the correlation value with the threshold.

5. The apparatus of claim 4, wherein the frame synchronization determiner comprises at least one threshold comparator having different thresholds, comparing the correlation value with each threshold, and enabling a frequency compensation function of the frequency error calculator if the correlation value is greater than each threshold.

6. The apparatus of claim 1, wherein the threshold varies according to system requirements comprising channel information, an initial synchronization time, and a false alarm probability.

7. A method of acquiring frame synchronization and frequency synchronization simultaneously in a communication system having a frame comprising a header having a constant length, the method comprising:
    performing a differential operation based on an input signal having symbol timing synchronization and a value pre-defined with a sender transmitting the input signal to obtain a differential operation result value;
    comparing the differential operation result value and a threshold set having at least one value, and if the differential operation result value is greater than the threshold set, generating a frequency compensation control signal; and
    compensating for a frequency error of the input signal based on the differential operation result value and the frequency compensation control signal.

8. The method of claim 7, wherein the performing of the differential operation comprises delaying a value obtained by multiplying the input signal by the pre-defined value in a one-symbol unit and calculating a differential correlation value corresponding to a half of the length of the header.

9. The method of claim 8, wherein the calculating of the differential correlation value comprises:
    obtaining a first result value by multiplying the input signal by a conjugate complex value of the pre-defined value;
    obtaining a second result value by obtaining a conjugate complex number after delaying the first result value by a one-symbol unit and multiplying the conjugate complex number by the first result value; and
    summing the second result value by the length of the header.

10. The method of claim 7, wherein the compensating of the frequency error of the input signal comprises:
    setting at least one threshold;
    obtaining a correlation value by multiplying a differential correlation result in the performing of the differential operation by an integer value to obtain a multiplication result and obtaining an absolute value of the multiplication result, and comparing the correlation value with the threshold; and
    if the correlation value is greater than the threshold, enabling the frequency compensation control signal.

11. The method of claim 10, wherein the threshold has at least one value varying according to system requirements comprising channel information, an initial synchronization time, and a false alarm probability.

12. A non-transitory computer readable recording medium storing a computer readable program for executing a method of acquiring frame synchronization and frequency synchronization simultaneously in a communication system having a frame comprising a header having a constant length, the method comprising:
    performing a differential operation based on an input signal having symbol timing synchronization and a value pre-defined with a sender sending the input signal to obtain a differential operation result value;
    compensating for a frequency error of the input signal based on the differential operation result value and a frequency compensation control signal; and
    comparing the differential operation result value and a threshold set having at least one value, and if the differential operation result value is greater than the threshold set, generating the frequency compensation control signal.

* * * * *